United States Patent [19]

Nakazato

[11] 4,296,971
[45] Oct. 27, 1981

[54] ANTISKID DEVICE
[75] Inventor: Hiroshi Nakazato, Hanyu, Japan
[73] Assignee: Akebono Brake Industry Co., Ltd., Saitama, Japan
[21] Appl. No.: 97,891
[22] Filed: Nov. 27, 1979
[30] Foreign Application Priority Data
Nov. 30, 1978 [JP] Japan ............................ 53-165254[U]
[51] Int. Cl.³ .............................................. B60T 8/10
[52] U.S. Cl. ...................................... 303/115; 303/119
[58] Field of Search ................................... 188/181 A; 303/113–115, 117, 119

[56] References Cited
U.S. PATENT DOCUMENTS
3,223,459 12/1965 Packer .................................. 303/115
3,414,336 12/1968 Atkin et al. ........................... 303/115
3,467,441 9/1969 Clark et al. ........................... 303/115

Primary Examiner—Duane A. Reger
Attorney, Agent, or Firm—Toren, McGeady & Stanger

[57] ABSTRACT

An antiskid pressure reducing device for a vehicle which lowers braking pressure to prevent wheels of the vehicle from coming into a locked state during brake application to the vehicle. A plunger, which moves back and forth as differential pressure between a high pressure chamber and a low pressure chamber increases or decreases, is arranged to slide to some extent within a cylinder during brake application which is frequently performed so that the plunger can be prevented from being stuck to the cylinder by rust to keep it unfailingly slidable for antiskid pressure reducing operations.

6 Claims, 2 Drawing Figures

ANTISKID DEVICE

BACKGROUND OF THE INVENTION

1. Field of the Invention

This invention relates to an antiskid pressure reducing device which lowers braking pressure to prevent wheels of a vehicle from coming into a locked state during brake application to the vehicle.

2. Description of the Prior Art

Generally, an antiskid pressure reducing device of the above stated type is provided with a power piston of a differential pressure motor, the power piston being arranged to move back and forth according as differential pressure between a high pressure chamber and a low pressure chamber increases or decreases; a plunger which is arranged to have one end thereof pressed to engage with the power piston by a hydraulic action of a pressure reducing chamber inserted in a braking hydraulic pressure transmission line, the plunger thus being arranged to follow the forward and backward movement of the power piston; and a valve mechanism which is arranged to open and close the braking hydraulic pressure transmission line according as the plunger moves following the power piston. When an antiskid control circuit detects a skidding state of a wheel during a braking operation on a vehicle, the differential pressure between the high and low pressure chambers of the differential pressure motor is increased to have the power piston move forward and, since there has thus taken place a hydraulic action in the pressure reducing chamber then, the plunger follows the forward movement of the power piston to cause the valve mechanism to shut off the braking hydraulic flow line. Then, the volume of the pressure reducing chamber is increased to lower the braking hydraulic pressure. Following that, when the wheel is released from the locked state, the differential pressure between the higher and lower pressure chambers of the differential pressure motor is lowered to allow the braking hydraulic pressure again to increase by an action opposite to the action performed for reduction in the braking hydraulic pressure; and then the valve mechanism is caused again to open the flow line.

In such arrangement, in order to ensure a satisfactory operation, it is necessary to keep the plunger slidable following the power piston without fail. The antiskid pressure reducing device of this type is generally arranged to operate when a vehicle is on a road surface having low frictional resistance. In reality, the use of the device is seldom required with the exception of a winter season during which road surfaces are frozen. Accordingly, the plunger which is made of metal is usually left unused over a long period of time and thus tends to rust and stick to the cylinder with which it is arranged to slidably engage. The probability of such sticking of the plunger has been presenting a threat of malfunction of the antiskid device. Further, the conventional antiskid pressure reducing devices have been provided with operation check mechanisms. However, most of these check mechanisms have been arranged to check up the operation of a power cylinder. They are not arranged to perform a check-up action under a condition in which braking hydraulic pressure is actually applied and, in effect, have not been performing any check-up for the sliding movability of the plunger.

SUMMARY OF THE INVENTION

It is an object of this invention to provide an antiskid pressure reducing device for a vehicle which eliminates the above stated shortcoming of the conventional devices with a plunger arranged to slide to some extent within a cylinder during ordinary brake application which is frequently performed on the vehicle so that the plunger and the cylinder can be effectively prevented from rusting and coming to stick to each other.

The above and further objects, features and advantages of the invention will become apparent from the following detailed description of preferred embodiments thereof taken in connection with the accompanying drawings.

DETAILED DESCRIPTION OF PREFERRED EMBODIMENTS

Figure 1:
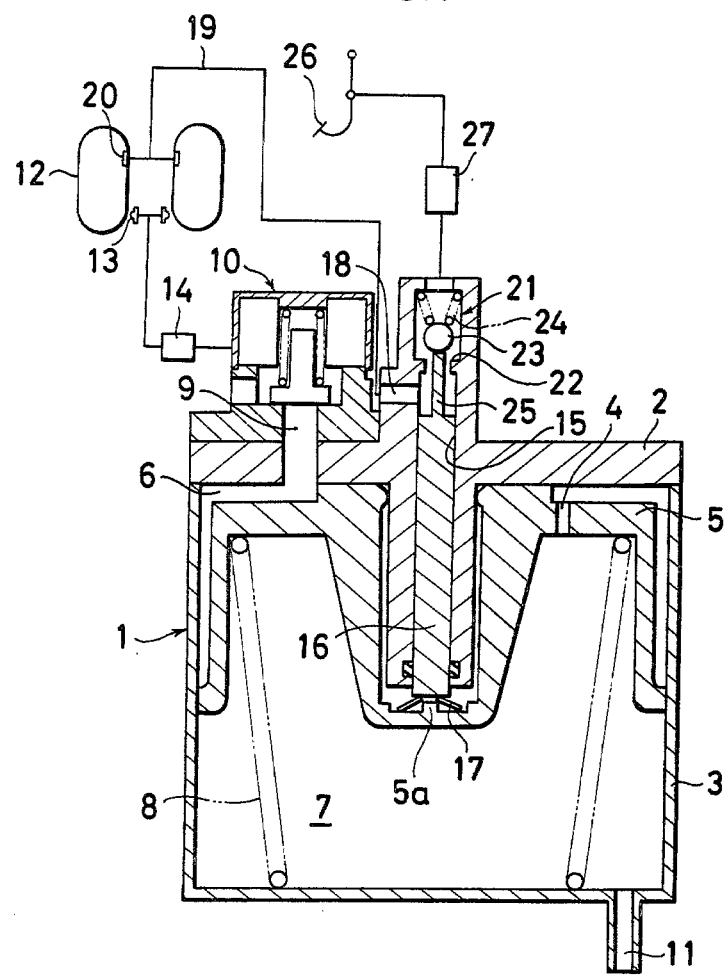
FIG. 1 is a longitudinal sectional view showing an antiskid pressure reducing device as one embodiment of the invention.

In FIG. 1, an antiskid pressure reducing device 1 has a casing 3 which is closed by a cylinder body 2. The inside of the casing 3 is divided into a high pressure chamber 6 and a low pressure chamber 7 by a power piston 5 which is provided with an orifice 4. The power piston 5 is biased toward the high pressure chamber 6 by means of a return spring 8. The high pressure chamber 6 is arranged to communicate with the atmosphere through a flow passage 9 and an electromagnetic valve 10. On the other hand, the low pressure chamber 7 is arranged to communicate, through a flow passage 11, with a negative pressure source such as an intake manifold or the like of an engine which is not shown.

There is provided a speed sensor 13 which is arranged to detect the rotation velocity of a wheel 12 of a vehicle. An antiskid control circuit 14 is arranged to detect a skidding state of the wheel 12 through a signal produced from the speed sensor 13. Upon detection of a skidding state of the wheel 12, the antiskid control circuit produces an operation signal which actuates the electromagnetic valve to open the flow passage 9 to allow the atmosphere to flow into the high pressure chamber 6.

The cylinder body 2 is provided with a cylinder 15 which is formed to permit a plunger 16 to be in slidable contact therewith. One end of the plunger 16 faces the power piston 5 and is arranged to come into pressed engagement with the piston 5. An initially coned disc spring 17 is interposed between the plunger 16 and the power piston 5 and is arranged to be directly in contact with both of them. In the middle part of the disc spring 17, there is provided an opening which is arranged to have a protrudent part 5a of the power piston 5 disposed in alignment therewith and protrude toward the plunger 16. The disc spring 17 is arranged such that the spring force of the disc spring 17 normally serves to retain a given space between the protrudent part 5a of the power piston 5 and the end of the plunger 16 to separate them from each other. The other end of the plunger 16 is disposed close to a pressure reducing chamber 18 which is arranged as described below:

The pressure reducing chamber 18 communicates with a brake device 20 through a braking hydraulic pressure transmission line 19 and is connected to a valve chamber 21 which is formed in the cylinder body 2. In this valve chamber 21, there is provided a valve mechanism which consists of a valve seat 22, a ball 23, a spring 24 and a locking rod part 25 extending from the plunger 16. The valve mechanism is arranged to normally keep a flow passage open between the valve chamber 21 and the pressure reducing chamber 18 and to close the flow passage when the plunger 16 slides following the movement of the power piston 5. A reference numeral 26 indicates a brake pedal and 27 indicates a master brake cylinder which is employed as hydraulic pressure source. The master cylinder produces braking hydraulic pressure in proportion to a stamping force applied to the brake pedal 26 and transmits the braking hydraulic pressure to the valve chamber 21.

With the antiskid pressure reducing device arranged as described in the foregoing, in an antiskid operation, the hydraulic pressure from the pressure reducing chamber 18 causes the plunger 16 to come into contact with the power piston 5 against the spring force of the disc spring 17 and then to slide following the power piston 5. However, during normal brake application without any antiskid operation, the plunger 16 is also caused to compress the disc spring 17 by the hydraulic pressure coming from the pressure reducing chamber 18 and, with the spring 17 arranged to have a spring force a little greater than the sliding resistance of the plunger 16, the plunger is arranged to slide on the cylinder 15 during every braking operation which is frequently applied to the vehicle, so that the plunger 16 and the cylinder 15 can be effectively prevented from rusting to eliminate the possibility of the sticking troubles which have been a problem with the conventional antiskid pressure reducing devices. The ball 23 is arranged not to come into contact with the valve seat when the hydraulic pressure moves the plunger 16 to cause it to hit the power piston 5.

However, the spring 17 may be arranged to have a relatively large spring force even if power piston 5 does not move in such a manner as to allow the ball 23 to come into contact with the valve seat when the plunger 16 is brought into contact with the power piston 5 by the hydraulic pressure. With such arrangement, the antiskid pressure reducing device of the present invention can be utilized to have it perform an additional function as so-called limiter valve which does not allow the hydraulic pressure of the rear wheel brake device 20 to increase after the hydraulic pressure of the master cylinder 27 has reached a predetermined value.

Further, since the plunger 16 is arranged to come into contact with the protrudent part 5a of the power piston 5, the compression of the initially coned disc spring 17 is thus limited to a given extent so that the spring 17 can be prevented from being fatigued through repeated operations.

Figure 2:
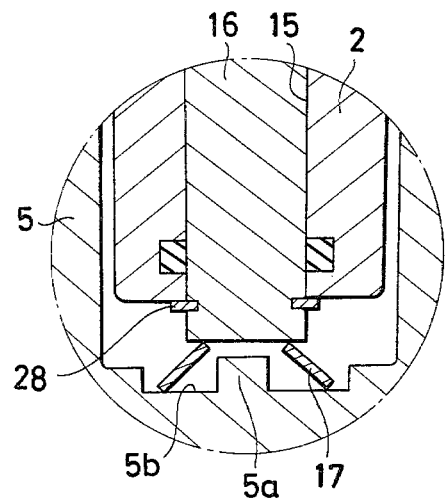
FIG. 2 is an enlarged detailed view showing a part of FIG. 1 as another embodiment of the invention.

FIG. 2 shows a second embodiment example of the invention. Referring now to FIG. 2, a clip 28 is secured to an end portion of the plunger 16 protruding out of the cylinder 15. The pushing force of the spring 17 brings the clip 28 into engagement with the cylinder body 2 to limit the movement of the plunger 16 toward the pressure reducing chamber 18. The use of this clip 28 may be replaced with provision of a flange part which is arranged into one unified body with the end portion of the plunger 16 and to have a larger diameter than the cylinder 15 to serve the same purpose as the use of the clip 28. The larger diameter end of the initially coned disc spring 17 is arranged to be set within an annular recess 5b provided in the power piston 5 to restrict the sidewise move of the spring 17.

What is claimed is:

1. An antiskid pressure reducing device comprising:
   a closed casing;
   a power piston located within said casing and dividing the interior of said casing into two pressure chambers and said power piston is movable by differential pressure developed between said two pressure chambers by detection of a skidding state of a wheel;
   a brake device;
   a pressure source;
   a braking pressure transmission line arranged between the pressure source and the brake device;
   a valve mechanism arranged to close said braking pressure transmission line;
   a pressure reducing chamber disposed between said valve mechanism and said brake device;
   said casing including a cylinder containing said valve mechanism;
   a plunger slidable within said cylinder, said plunger being arranged to receive pressure at one end thereof from said pressure reducing chamber; and
   a spring means disposed between the other end of the said plunger and said power piston for spacing them a given distance apart, said spring means being arranged to push said plunger with a force greater than the sliding resistance of said plunger;
   said plunger is in operative engagement with said valve mechanism; and said valve mechanism is arranged to be closed when pressure from said pressure reducing chamber causes said plunger to move toward said power piston against the force of spring means even if said power piston does not move.

2. An antiskid pressure reducing device according to claim 1, wherein said spring means is directly in contact with both said plunger and said power piston; said plunger is arranged to be moved by pressure exerted on one end thereof; and the extent to which said plunger is movable is restricted by its contact with said power piston.

3. An antiskid pressure reducing device according to claim 1, wherein the movement of said plunger toward said pressure reducing chamber is restricted by a stopping means provided at the other end of said plunger.

4. An antiskid pressure reducing device according to claim 2, wherein said power piston is provided with a protrudent part extending toward said plunger; and said protrudent part is arranged such that compression of said spring means is limited to a given extent with said plunger coming into contact with said protrudent part.

5. An antiskid pressure reducing device according to claim 4, wherein said spring means is an initially coned disc spring having an opening in the middle part thereof, said middle opening being arranged to be positioned in alignment with said protrudent part of said power piston.

6. An antiskid pressure reducing device according to claim 5, wherein the larger diameter end of said initially coned disc spring is arranged to be set within an annular recessed part of said power piston to have the sidewise movement of said spring restricted thereby.

* * * * *